(12) United States Patent
Jayaprakash

(10) Patent No.: US 10,122,594 B2
(45) Date of Patent: Nov. 6, 2018

(54) IDENTIFYING A MONITORING TEMPLATE FOR A MANAGED SERVICE BASED ON A SERVICE-LEVEL AGREEMENT

(71) Applicant: HEWLETT PACKARD ENTERPRISE DEVELOPMENT LP, Houston, TX (US)

(72) Inventor: Arun Jayaprakash, Bangalore (IN)

(73) Assignee: Hewlett Pacard Enterprise Development LP, Houston, TX (US)

( * ) Notice: Subject to any disclaimer, the term of this patent is extended or adjusted under 35 U.S.C. 154(b) by 102 days.

(21) Appl. No.: 15/032,643

(22) PCT Filed: Dec. 5, 2013

(86) PCT No.: PCT/US2013/073277
§ 371 (c)(1),
(2) Date: Apr. 28, 2016

(87) PCT Pub. No.: WO2015/084363
PCT Pub. Date: Jun. 11, 2015

(65) Prior Publication Data
US 2016/0248638 A1    Aug. 25, 2016

(51) Int. Cl.
| | |
|---|---|
| *G06F 15/173* | (2006.01) |
| *H04L 12/24* | (2006.01) |
| *G06F 11/34* | (2006.01) |
| *G06F 11/00* | (2006.01) |
| *G06F 17/30* | (2006.01) |
| *H04L 12/26* | (2006.01) |

(52) U.S. Cl.
CPC ........ *H04L 41/5009* (2013.01); *G06F 11/006* (2013.01); *G06F 11/3495* (2013.01); *G06F 17/30867* (2013.01); *H04L 43/08* (2013.01); *G06F 11/3409* (2013.01); *G06F 2201/875* (2013.01)

(58) Field of Classification Search
CPC .... H04L 41/5009; H04L 43/08; G06F 11/006; G06F 11/3495; G06F 11/3409; G06F 2201/875
USPC .................................................. 709/223, 224
See application file for complete search history.

(56) References Cited

U.S. PATENT DOCUMENTS

| | | |
|---|---|---|
| 8,073,721 B1 | 12/2011 | Lewis et al. |
| 8,341,601 B2 | 12/2012 | Chan et al. |
| 8,380,345 B2 | 2/2013 | Mercuri |

(Continued)

OTHER PUBLICATIONS

"CA Nimsoft Monitor for Cisco UCS", NimServe.com; 2013, 2 pages <http://www.nimserve.com/Cisco-UCS.asp>.

(Continued)

*Primary Examiner* — Thu Ha T Nguyen
(74) *Attorney, Agent, or Firm* — Brooks, Cameron & Huebsch, PLLC

(57) ABSTRACT

Provided is a method of identifying a monitoring template for a managed service based on a Service-Level Agreement (SLA). A tag on a monitoring template is compared with a tag on a service template used for implementing the managed service, wherein the tag on the service template is based on the SLA. In response to a match between the tag on the monitoring template and the tag on the service template, a monitoring template is identified for the managed service.

19 Claims, 4 Drawing Sheets

(56) References Cited

U.S. PATENT DOCUMENTS

| | | | | |
|---|---|---|---|---|
| 8,781,104 | B1* | 7/2014 | Allen | H04L 12/1403 379/201.01 |
| 9,386,033 | B1* | 7/2016 | Rossman | H04L 63/1433 |
| 9,392,462 | B2* | 7/2016 | Raleigh | H04W 12/08 |
| 9,712,535 | B1* | 7/2017 | Rossman | H04L 63/10 |
| 9,806,964 | B2* | 10/2017 | Allen | H04L 12/1403 |
| 9,813,305 | B2* | 11/2017 | Bertram | H04L 41/22 |
| 9,917,811 | B2* | 3/2018 | Folco | H04L 63/02 |
| 10,027,569 | B1* | 7/2018 | Ur | H04L 43/0876 |
| 2006/0184473 | A1* | 8/2006 | Eder | G06N 5/022 706/20 |
| 2007/0093916 | A1* | 4/2007 | Sanghvi | G06F 11/30 700/17 |
| 2008/0034082 | A1 | 2/2008 | McKinney | |
| 2010/0122119 | A1* | 5/2010 | Bildhauer | G06F 11/3409 714/47.1 |
| 2011/0307412 | A1* | 12/2011 | Rolia | G06Q 10/06 705/348 |
| 2012/0066217 | A1* | 3/2012 | Eder | G06Q 10/00 707/723 |
| 2012/0158633 | A1* | 6/2012 | Eder | G06F 19/3437 706/46 |
| 2012/0222110 | A1* | 8/2012 | Huang | H04L 43/028 726/22 |
| 2013/0007265 | A1 | 1/2013 | Benedetti et al. | |
| 2013/0124713 | A1* | 5/2013 | Feinberg | G06F 11/0769 709/224 |
| 2013/0212129 | A1 | 8/2013 | Lawson et al. | |
| 2013/0254897 | A1* | 9/2013 | Reedy | G06F 21/6218 726/26 |
| 2014/0077956 | A1* | 3/2014 | Sampath | A61B 5/0022 340/573.1 |
| 2014/0130055 | A1* | 5/2014 | Guha | G06F 3/0604 718/104 |
| 2014/0223573 | A1* | 8/2014 | Reedy | G06F 21/6218 726/26 |
| 2014/0324690 | A1* | 10/2014 | Allen | G06Q 20/36 705/41 |
| 2015/0188789 | A1* | 7/2015 | Jayaprakash | G06F 11/3003 709/224 |
| 2016/0006672 | A1* | 1/2016 | Saavedra | H04L 49/00 370/401 |
| 2016/0042031 | A1* | 2/2016 | Bertram | G06F 17/3012 707/736 |
| 2016/0196587 | A1* | 7/2016 | Eder | G06Q 30/00 705/14.49 |
| 2017/0104782 | A1* | 4/2017 | Folco | H04L 63/02 |
| 2017/0206107 | A1* | 7/2017 | Guha | G06F 9/45558 |
| 2018/0034713 | A1* | 2/2018 | Allen | H04L 12/1403 |

OTHER PUBLICATIONS

Dastjerdi et al., "A dependency-aware ontology-based approach for deploying service level agreement monitoring services in Cloud", Wiley Online Library (wileyonlinelibrary.com), Jul. 27, 2011, 18 pages.

Korean Intellectual Property Office, International Search Report and Written Opinion, dated Aug. 30, 2014, Daejeon Metropolitan City, Republic of Korea, 13 pages.

Mosallanejad et al., "HA-SLA: A Hierarchical Autonomic SLA Model for SLA Monitoring in Cloud Computing", Journal of Software Engineering and Applications, Mar. 2013, 6, pp. 114-117.

\* cited by examiner

IDENTIFYING A MONITORING TEMPLATE FOR A MANAGED SERVICE BASED ON A SERVICE-LEVEL AGREEMENT

CROSS-REFERENCE TO RELATED APPLICATION

This application is a U.S. National Stage Application of and claims priority to International Patent Application No. PCT/US2013/073277, filed on Dec. 5, 2013, and entitled "Identifying A Monitoring Template For A Managed Service Based On A Service-Level Agreement," the entire content of which is hereby incorporated in its entirety.

BACKGROUND

Cloud computing has rapidly evolved as a new model of technology whereby shared pool of configurable computing resources are offered in ubiquitous and on-demand manner to a subscriber. Generally speaking, cloud computing involves delivery of computing as a service rather than a product, whereby shared resources (software, storage resources, etc.) are provided to computing devices as a service. The resources are shared over a network, which is typically the internet. Cloud computing thus provides a quick and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
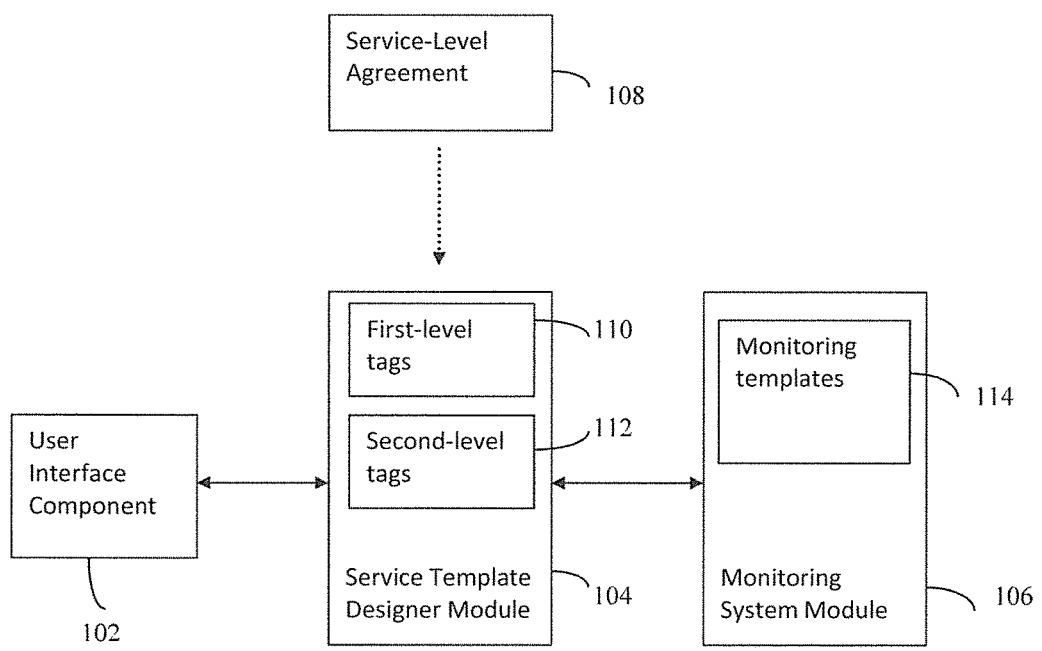
FIG. 1 illustrates a system for identifying a monitoring template for a managed service based on a service-level agreement, according to an example.

Cloud computing has fundamentally changed the way IT services are delivered to enterprises. It has enabled companies to focus on their core competencies by helping them reduce costs and providing much needed scalability to IT resources required for effective functioning.

Typically, managers of cloud-based environments first gather subscribers' needs and then instruct respective administrators (of servers, networks, and storage) to provision them as demanded. Based on the service request assigned to an administrator, the resources are provided to the subscriber. The process of provisioning resources is mapped onto a service template for future and/or repetitive use. Based on a more comprehensive understanding of the subscribers' requirements, such service templates may also undergo revisions.

A managed service involves outsourcing of a specific IT operation to an external service provider. It is the service provider who assumes responsibility for hosting, monitoring, and managing of a selected IT service on an enterprise's behalf. A managed service may be realized by implementing a service template.

A typical service template defines the different resources that are required for the managed service such as server, network, physical memory, and expandable storage. A service template may also include the provision to install certain applications as demanded by its subscribers. These applications are usually, but not restricted to, database servers, web servers, application servers, mail servers, FTP servers, etc.

While designing a service template for providing servers and applications, the usual process is to map the required hardware resources appropriately, and to define the applications that will be hosted on these servers. For example, consider a service template that is being designed to provide an Oracle database on a Linux server. Usually, the hardware resources needed for a service such as physical memory, hard drive space, processor speed and architecture as well as network interfaces are identified and applied on the server's blueprint. Let us assume that a subscriber wishes to monitor both the utilization ratios of the Linux server and the utilization ratios of the Oracle database server. In an example, the monitoring system of the data center could be manually queried to identify whether monitoring templates are available in the system that can be deployed to track the utilization of an Oracle database and a Linux host. If available, the service template is defined to deploy these monitoring templates once the service is realized.

It is essential that the resources provisioned to subscribers are monitored on a regular basis for a smooth functioning of a data center. A typical expected clause in service-level agreements (SLAs) between a cloud service provider and a subscriber is very low downtime and low latency between requests and response. Thus, a cloud service provider is required to ensure that the data center translates all incoming requests into managed services as quickly as possible. This also means that the data center may have to be available 24×7 and a cloud service provider cannot afford downtime or a slow data center.

The cost of monitoring varies depending on the targets that are required to be monitored. Hardware resources such as physical memory, hard drive space, processor speed and architecture, etc. often have a lower monitoring cost than application resources such as application servers, database servers, mail servers, etc. The actual monitoring requirements are influenced by the SLA between a service provider and a subscriber. A subscriber who requests for simple services may desire an inexpensive monitoring service when compared to a subscriber, who requests a complex service that includes for instance one or more application servers, database servers, and mail servers. Based on the SLA between a service provider and a subscriber, the monitoring requirement is analyzed and applied to the service template.

The issue with the present solutions is the manual effort required to identify the appropriate monitoring templates and apply them on a service template. In this effort, one or more incorrect monitors may be applied onto a managed service, which may not be apparent until the monitoring data is retrieved and examined. It is also possible that a monitor required by the SLA may not be applied at all.

Proposed is a solution for identifying a monitoring template for a managed service based on a service-level agreement. The proposed solution automates the process of identifying monitoring templates by using the essence of the monitoring requirements defined in an SLA and then applying them on the elements of a service template while designing it.

FIG. 1 illustrates a system 100 for identifying a monitoring template for a managed service based on a service-level agreement, according to an example. System 100 includes user interface component 102, service template designer module 104, and monitoring system module 106. In an implementation, system 100 may include a workflow engine module (not shown) together with monitoring system module or in place of monitoring system module. User interface component 102 is used to define, create and/or modify a service template in a service template designer module 104. In an implementation, user interface component 102 is a web browser on a computer system or dumb terminal.

Service template designer module 104 is used to define, create, modify, and/or delete a service template. In an example, user interface component is used as a front end tool to define, create, modify, and/or delete a service template in the service template designer module. A service template is akin to a building blue print designed by an architect before the start of a construction activity. Like a construction blue print, a typical service template aims to define various computing resources that are required for implementing a managed cloud service. These computing resources (also termed as service elements) may include, by way of non-limiting example, server, network, physical memory, storage, applications, etc. A cloud architect (or service designer) may use service template designer module 104 to define various building blocks (service elements) required for implementing a service in a cloud. These service elements are used to create a service template for use by a subscriber, an administrator, an operator, etc. To provide an example, for a compute infrastructure service, service template designer module may be used to specify server deployment elements such as number of CPU cores, amount of memory, size of boot disk, etc. in the form of a service template offering. Once a service template is created, it can be used to deploy the corresponding service. A service template can also be reused or modified in future.

In an implementation, tags are used to define different types of service templates (and consequently the associated services). Tags are used to classify various service templates depending upon the type of monitoring service they require. In an example, tags are used to indicate the complexity (for instance, number of parameters to be monitored, types of parameters to be monitored, frequency of monitoring, etc.) of a monitoring service required to be applied to a service template. For instance, service templates that require simple monitoring services can be tagged as BRONZE, while increasingly complex monitoring services can be tagged as SILVER, GOLD, or PLATINUM. The tag NOMONITORING may be used to indicate that a monitoring service is not required for a service template. In another example, tags define the cost of a monitoring service required to be applied to a service template. The cost of monitoring varies depending on the targets that are required to be monitored. Hardware resources such as physical memory, hard drive space, processor speed and architecture, etc. often have a lower monitoring cost than application resources such as application servers, database servers, mail servers, etc. The actual monitoring requirements of a service template may be influenced by a Service-Level Agreement (SLA) 108 between a service provider and a subscriber. In an example, tags used to define different types of service templates represent first-level of tagging of a service template (or first-level tags 110).

In another implementation, tags are used to define various service elements present in a service template. Tags are used to classify various service elements depending upon the type of monitoring service they require. For example, in case of a service template comprising of an operating system and an application as service elements, tags may be used to define different parameters (such as Application type, Application name, Operating system, OS architecture, OS version, etc.) of the service elements. Similar to the above example, tags may be used to indicate the complexity of a monitoring service required to be applied to a service element. For instance, service elements that require simple monitoring services can be tagged as BRONZE, while increasingly complex monitoring services can be tagged as SILVER, GOLD, or PLATINUM. The tag NOMONITORING may be used to indicate that a monitoring service is not required for a service element. The actual monitoring requirements of a service element may be influenced by a Service-Level Agreement (SLA) between a service provider and a subscriber. In an example, tags used to define different types of service elements represent second-level of tagging of service templates (or second-level tags 112).

Monitoring system module 106 is used to monitor the utilization pattern of a cloud service such as a managed cloud service. In an implementation, monitoring system module 106 includes a monitoring template (or monitoring templates) 114. A monitoring template 114 defines a monitoring policy which is to be applied to a service template or service element. A monitoring policy defines the various performance characteristics which may be monitored in respect of a resource (for example, a service, template or service element).

In an example, a monitoring template 114 is used to monitor performance characteristics of different computing resources (service elements) defined in a service template that is used for implementing a service. To provide an illustration in the context of the compute infrastructure service example mentioned above, a monitoring template in this case may monitor the utilization rates of CPU cores, memory, boot disks, etc. A monitoring template may monitor various types of performance characteristics such as but not limited to downtime, latency rate, availability, service time, response time, etc.

In an implementation, tags are used to define different types of monitoring templates. Tags are used to classify various monitoring templates depending upon the type of monitoring service they provide. In an example, tags are used to indicate the complexity of a monitoring service which a monitoring template would provide upon its application to a resource (for example, a service template or service element). For instance, monitoring templates that provide simple monitoring services can be tagged as BRONZE, while templates providing increasingly complex monitoring services can be tagged as SILVER, GOLD, or PLATINUM.

In an implementation, similar or corresponding tags are used to define monitoring templates as well as service templates (or service elements) on which the monitoring templates may be applied.

Components of system 100 i.e. user interface component 102, service template designer module 104, and monitoring system module 106 are hosted on a cloud computing environment (or "cloud"). As used herein, the term "cloud" may include a public cloud, a private cloud, a hybrid cloud or a traditional data center offering cloud services. Cloud could offer, provide or deploy various types of cloud services for a user or customer. These could include Infrastructure as a Service (IaaS), Platform as a Service (PaaS), Software as a Service (SaaS), and so forth. Cloud may include various types of service elements (or computing resources). These computing resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc.

It would be appreciated that the components depicted in FIG. 1 are for the purpose of illustration only and the actual components (including their number) may vary depending on the computing architecture deployed for implementation of the present invention.

Figure 2:
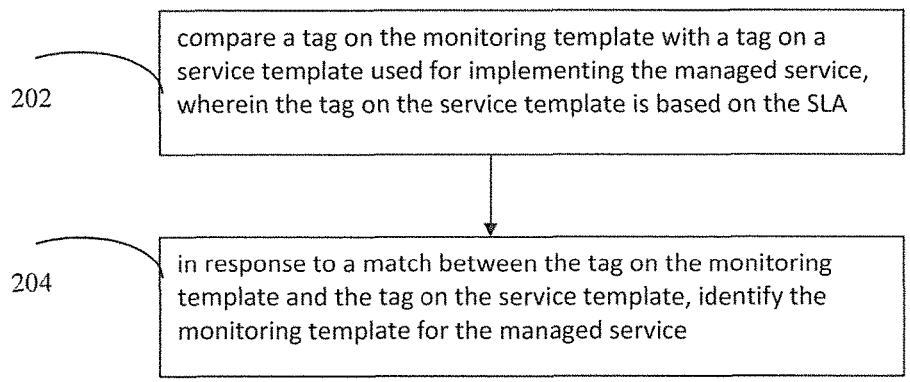
FIGS. 2 to 4 illustrate a method of identifying a monitoring template for a managed service based on a service-level agreement, according to an example.

FIG. 2 illustrates a method of identifying a monitoring template for a managed service based on a service-level agreement, according to an example. At block 202, a tag on a monitoring template is compared with a tag on a service template used for implementing a managed service. As mentioned earlier, a service template may define various computing resources that may be required for implementing a managed cloud-based service. A monitoring template is used for monitoring performance characteristics of different computing resources (service elements) defined in a service template.

A tag on a service template indicates the level of complexity of a monitoring service required to be applied to the service template. For instance, service templates that require simple monitoring services can be tagged as BRONZE, while increasingly complex monitoring services can be tagged as SILVER, GOLD, or PLATINUM. Likewise, a tag on a monitoring template indicates the complexity of a monitoring service which a monitoring template would provide when applied to a resource (for example, a service template or service element). For instance, monitoring templates that provide simple monitoring services can be tagged as BRONZE, while templates providing increasingly complex monitoring services can be tagged as SILVER, GOLD, or PLATINUM.

In an implementation, the tag on the service template is based on a Service-Level Agreement between a subscriber and the service provider providing the managed service, and may represent the level of complexity of a monitoring service desired for the managed service by the subscriber. For instance, if a SLA indicates that a managed service is required to be monitored in respect of a few parameters only, then a lower level complexity tag (for example, a BRONZE tag) may be defined in the service template used for implementing the managed service.

At block 204, in the event of a match between the tag on the monitoring template and the tag on the service template, the monitoring template is identified as a potential candidate for monitoring the managed service. In an example, a plurality of monitoring templates may include a tag corresponding to the tag on the service element. In the event, all such monitoring templates may be identified as potential candidates for monitoring the managed service. To provide an illustration in context of the above mentioned example, if a BRONZE tag is defined in the service template used for implementing a managed service then all those monitoring templates that include a BRONZE tag may be identified as potential candidates for monitoring the managed service.

Once a monitoring template with a tag corresponding to the tag on the service template is identified, the identified template is applied to the service template automatically. In the event, a plurality of monitoring templates having a tag corresponding to the tag on the service template are identified, a user may select one of them for application to the service template.

Figure 3:
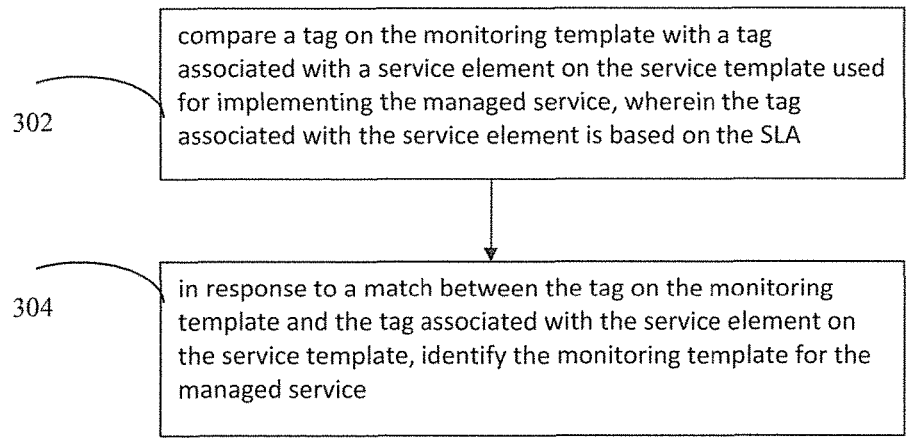

FIG. 3 illustrates a method of identifying a monitoring template for a managed service based on a service-level agreement, according to an example. The method in FIG. 3 is a continuation of the method of FIG. 2. At block 302, the tag on the monitoring template is compared with a tag (or tags) associated with a service element (or service elements) on the service template used for implementing the managed service. As mentioned earlier, a service template may include various service elements that may be required for implementing a managed cloud-based service. Tags are used to define and classify various service elements present in a service template depending upon the type of monitoring service they require. For example, tags may be used to define different parameters (such as Application type, Application name, Operating system, OS architecture, OS version, etc.) of the service elements. In an example, tags are used to indicate the complexity of a monitoring service required to be applied to a service element. For instance, service elements that require simple monitoring services can be tagged as BRONZE, while service elements requiring increasingly complex monitoring services can be tagged as SILVER, GOLD, or PLATINUM.

In an implementation, the tag associated with a service element on the service template is based on a Service-Level Agreement between a subscriber and the service provider providing the managed service, and may represent the level of complexity of a monitoring service desired for the service element by the subscriber. For instance, if a SLA indicates that a server deployed in a managed service is required to be monitored in respect of a few parameters only, then a lower level complexity tag (for example, a BRONZE tag) may be defined for the service element used for implementing the managed service.

At block 304, in the event of a match between the tag on the monitoring template and the tag associated with the service element, the monitoring template is identified as a potential candidate for monitoring the managed service. In an example, a plurality of monitoring templates may include a tag corresponding to the tag associated with the service element. In the event, all such monitoring templates may be identified as potential candidates for monitoring the managed service. To provide an illustration in context of the above mentioned example, if a BRONZE tag is defined for the service element used for implementing a managed service then all those monitoring templates that include a BRONZE tag may be identified as potential candidates for monitoring the managed service.

Once a monitoring template with a tag corresponding to the tag associated with a service element is identified, a user may select the identified monitoring template for application to the service template. In the event, a plurality of monitoring templates having a tag corresponding to the tag associated with a service element are identified, a user may select one of them for application to the service template. The method of FIG. 3 provides a second level filtration of the monitoring templates identified during the method of FIG. 2. In other words, if a plurality of monitoring templates having a tag corresponding to the tag on the service template are identified during the method of FIG. 2 such monitoring templates are filtered by the method of FIG. 3 to identify monitoring templates with a tag corresponding to a tag (tags) associated with a service element (or service elements) on the service template.

Figure 4:
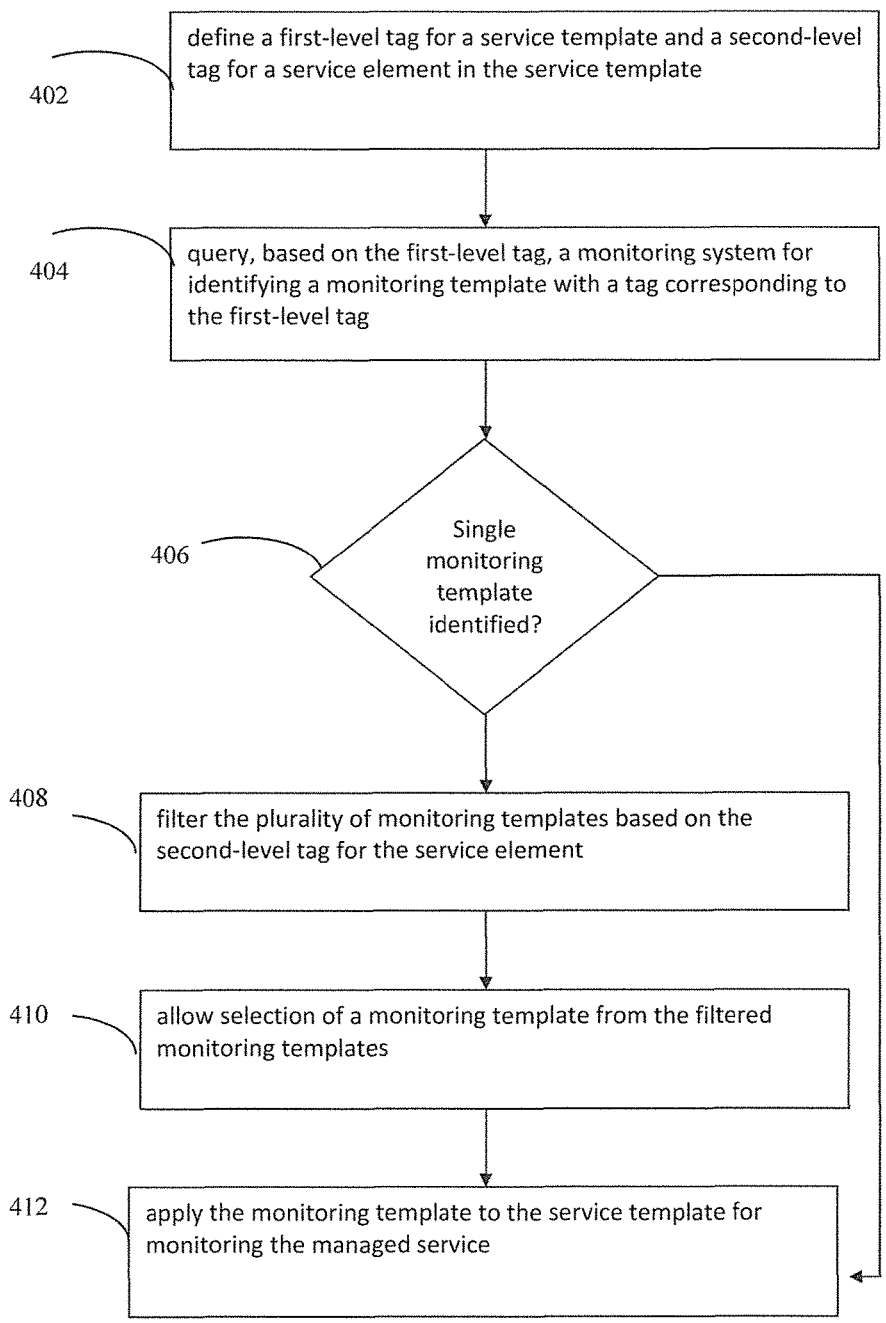

FIG. 4 illustrates a method of identifying a monitoring template for a managed service based on a service-level agreement, according to an example. At block 402, a user (for example, a cloud architect or service designer) designs a service template for providing a managed cloud service on a cloud. The design of a service template may involve defining various service elements (such as servers, networks, memory, storage, etc.) required for implementing the managed service. In an implementation, during design of the service template, the user refers to a Service-Level Agreement (SLA) between a subscriber and the managed service provider to identify the type of monitoring service(s) desired by the subscriber for the managed service per se and the various service elements defined in the service template which would be used for implementing the managed service. Depending upon the type of monitoring services desired, the user defines a tag for the service template and a tag (or tags) for the service element (or service elements) present in the service template. In an example, the tag(s) represent the level of complexity of monitoring service which may be applied to a service template or service element. The tag used for defining the service template represents a first-level of tagging (or first-level tags) and the tag(s) used for defining a service element(s) represent a second-level of tagging (or second-level tags). In case no monitoring is required vis-à-vis a managed service, the service template used for implementing the managed service may be tagged accordingly, for instance by using a NOMONITORING tag.

At block 404, a monitoring system module is queried for identifying a monitoring template corresponding to the tag defined for the service template. In other words, the monitoring system module is queried for identifying a monitoring template (or monitoring templates) corresponding to a first-level tag defined in the service template. In an example, the monitoring system includes a plurality of monitoring templates. As mentioned earlier, a monitoring template defines a monitoring policy which is to be applied to a service template or service element. The monitoring policy defines the various performance characteristics which may be monitored in respect of a resource (for example, a service template or service element). Each monitoring template in the monitoring system module is defined by a tag. The tag indicates the complexity of a monitoring service which a monitoring template would provide when applied to a resource (for example, a service template or service element). In an implementation, similar or corresponding tags are used to define monitoring templates as well as service templates (or service elements) on which the monitoring templates may be applied.

In an implementation, in place of the monitoring system module, a workflow engine module is queried for identifying a monitoring template corresponding to the tag defined for the service template. In such case, the workflow engine acts as a repository containing tagged monitoring templates. The workflow engine that acts as a repository is used to identify monitoring templates, instead of directly using the monitoring system to identify tagged monitoring templates. The workflow engine may use the tagging mechanism to identify which workflows will apply the templates.

At block 406, the results of query performed at block 402 are displayed. In case only one matching monitoring template is found, the identified template is applied to the service template automatically (block 412). In the event, a plurality of matching monitoring templates are identified, a tag (or tags) associated with a service element (or service elements) defined in the service template is/are used to filter the results (block 408). In other words, the identified monitoring templates are compared against the second-level tags (defined for the service elements) in the service template. Monitoring templates that do not match with the tag (or tags) associated with a service element (or service elements) are discarded from the results.

At block 410, a user is given the option to select a monitoring template, from the filtered results, for application to the service template.

At block 412, the selected monitoring template is applied to the service template to enable monitoring of the managed service implemented by the service template.

Figure 5:
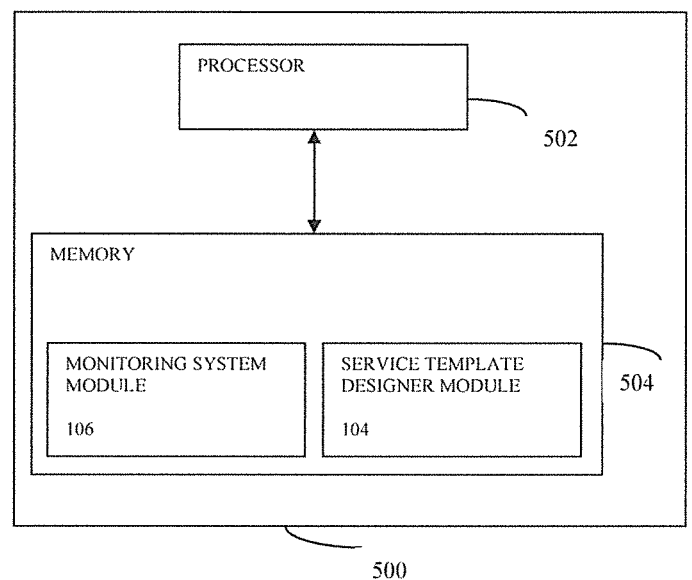
FIG. 5 illustrates a system for identifying a monitoring template for a managed service based on a service-level agreement, according to an example.

FIG. 5 illustrates an example system 500 for identifying a monitoring template for a managed service based on a service-level agreement, according to an example. System 500 includes a processor 502 that executes instructions in a memory 504. The memory 504 includes a service template designer module 104 to define a first-level tag for a service template and a second-level tag for a service element present in the service template, wherein the service template is used for implementing a managed cloud service. A monitoring system module 106 receives a query from the service template designer module 104, based on a first-level tag, for identifying monitoring templates with a tag corresponding to the first-level tag and filter the identified monitoring templates based on a second-level tag for the service element present in the service template.

For the purpose of simplicity of explanation, the example method of FIGS. 2 to 4 are shown as executing serially, however it is to be understood and appreciated that the present and other examples are not limited by the illustrated order. The example system of FIG. 1 and methods of FIGS. 2 to 4 may be implemented in the form of a computer program product including computer-executable instructions, such as program code, which may be run on any suitable computing environment in conjunction with a suitable operating system such as, but not limited to, Microsoft Windows, Linux or UNIX operating system. Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and be executed by a processor.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of identifying a monitoring template for a managed service based on a Service-Level Agreement (SLA), comprising:
    comparing a tag on the monitoring template with a first-level tag on a service template used for implementing the managed service, wherein the first-level tag on the service template and a second-level tag on a service element are based on the SLA, the managed service being a cloud-computing service deployed on a cloud-computing infrastructure including computing hardware, wherein the service element is a computing resource used to implement the managed service in a cloud such as a server, a network, a physical memory, a storage, or an application;
    in response to a match between the tag on the monitoring template and the first-level tag on the service template, identifying the monitoring template for the managed service;
    monitoring the managed service according to the identified monitoring template; and
    applying the monitoring template to the service template.

2. The method of claim 1, wherein the tag indicates a level of complexity of monitoring service defined in the SLA.

3. The method of claim 1, further comprising:
    comparing the tag on the monitoring template with the second-level tag associated with the service element on the service template used for implementing the managed service, wherein the tag associated with the service element is based on the SLA; and
    in response to a match between the tag on the monitoring template and the second-level tag associated with the service element on the service template, identifying the monitoring template for the managed service.

4. The method of claim 1, wherein identifying the monitoring template for the managed service comprises:
    determining a plurality of available monitoring templates that correspond to the first-level tag of the service template; and
    selecting one of the available monitoring templates as the identified monitoring template.

5. The method of claim 4, wherein identifying the monitoring template for the managed service further comprises:
    filtering the available monitoring templates based on the second-level tag of the service element of the service template,
    wherein the one of the available monitored templates is selected from the filtered available monitoring templates.

6. The method of claim 5, wherein the service template has a plurality of service elements.

7. The method of claim 6, wherein the service elements each correspond to a computing resource that the managed service uses.

8. The method of claim 5, wherein the second level-tag of the service element indicates a monitoring service complexity required by the service element.

9. The method of claim 1, wherein the tag of the service template indicates a monitoring service complexity required by the service template.

10. A method of identifying a monitoring template for a managed service based on a Service-Level Agreement (SLA), comprising:
    defining a first-level tag for a service template, used for implementing the managed service, the managed service being a cloud-computing service deployed on a cloud-computing infrastructure including computing hardware and a second-level tag for a service element, wherein the service element is a computing resource used to implement the managed service in a cloud such as a server, a network, a physical memory, a storage, and an application;
    querying, based on the first-level tag, a monitoring system for identifying a monitoring template with a tag corresponding to the first-level tag;
    in response to identifying only a single monitoring template with the tag corresponding to the first-level tag, automatically applying the identified single monitoring template to the service template for monitoring the managed service; and
    monitoring the managed service according to the identified monitoring template.

11. The method of claim 10, further comprising:
    defining the second-level tag for the service element in the service template;
    in response to identifying a plurality of monitoring templates with the tag corresponding to the first-level tag, filtering the plurality of monitoring templates based on the second-level tag for the service element; and
    allowing selection of a monitoring template from the filtered monitoring templates.

12. The method of claim 11, further comprising applying the selected monitoring template to the service template for monitoring the managed service.

13. The method of claim 10, wherein the first-level tag and the second-level tag are based on the Service-Level Agreement (SLA).

14. The method of claim 10, wherein the first-level tag and the second-level tag are defined during creation of the service template.

15. A system, comprising:
    a processor;
    a non-transitory computer-readable data storage medium storing code executable by the processor to:
        define a first-level tag for a service template used for implementing a managed cloud service deployed on a cloud-computing infrastructure including computing hardware;
        define a second-level tag for a service element, wherein the service element is a computing resource used to implement the managed cloud service in a cloud such as a server, a network, a physical memory, a storage, and an application; and
        receive a query, based on the first-level tag, for identifying monitoring templates with a tag corresponding to the first-level tag, the managed cloud service monitored according to a monitoring template selected from the identified monitoring templates.

16. The system of claim 15, wherein the code is executable by the processor to further:

define the second-level tag for the service element present in the service template; and filter the identified monitoring templates based on the second-level tag for the service element present in the service template.

17. The system of claim 16, wherein the code is executable by the processor to further display results of the filtration.

18. The system of claim 15, wherein the managed cloud service is hosted on one of a private cloud, public cloud or hybrid cloud.

19. A non-transitory processor readable medium, the non-transitory processor readable medium comprising machine executable instructions, the machine executable instructions when executed by a processor causes the processor to:

define a first-level tag for a service template used for implementing the managed service, the managed service being a cloud-computing service deployed on a cloud-computing infrastructure including computing hardware;

define a second-level tag for a service element in the service template, wherein the service element is a computing resource used to implement the managed service in a cloud such as a server, a network, a physical memory, a storage, and an application;

query, based on the first-level tag, a monitoring system for identifying a monitoring template with a tag corresponding to the first-level tag;

in response to identifying only a single monitoring template with the tag corresponding to the first-level tag, automatically apply the identified single monitoring template to the service template for monitoring the managed service;

in response to identifying a plurality of monitoring templates with the tag corresponding to the first-level tag, filter the plurality of monitoring templates based on the second-level tag for the service element;

display filtered monitoring templates, the managed service monitored according to a monitoring template selected from the filtered monitoring templates.

* * * * *